United States Patent Office 2,814,550
Patented Nov. 26, 1957

2,814,550

HIGH VISCOSITY SALINE COAGULANTS FOR LATEXES

Roland E. Gunderman, Clare, and Robert M. Karlinski, Saginaw, Mich., assignors to The Dow Chemical Company, Midland, Mich., a corporation of Delaware No Drawing. Application June 2, 1955,
Serial No. 512,858

5 Claims. (Cl. 18—54)

This invention relates to improved coagulants for natural and synthetic latexes, useful in making films or fibers.

The term "latex" is used herein to include such natural products as rubber latex and such synthetic polymer emulsions, having the appearance of a latex, as are obtained by emulsion polymerization procedures. Any such "latex" is susceptible to coagulation on contact with electrolytes, especially salts of polyvalent metals, and many latexes are capable of being coagulated as coherent films or fibers.

When films or fibers are to be made from latexes, it is necessary to bring a continuous supply of the latex or of a coagulant into contact with a body of coagulant or of latex, respectively. Thus, the latex may be carried on a roll, or extruded or spun into contact with a coagulant solution, to form a sheet or filamentary coagulum, or the coagulant solution may be carried on a roll or pumped in a fine stream into the latex to acquire a coating of coagulum. Typically, this coating is a cylindrical sheath of coagulum which becomes a hollow filament. In either case it is desirable that the rate of permeation of the liquid coagulant through the fresh coagulum be slow enough to prevent rupture of the initially weak coagulated article. It has been found that water solutions of such common coagulant salts as calcium chloride, manganese chloride, or aluminum chloride or sulfate have such low viscosities that they penetrate and permeate the coagulum rapidly, often resulting in a weak article which ruptures under the moderate pull required to withdraw the film or filamentary product from the surface on which or the bath in which it is formed.

It is the object of this invention to provide an aqueous saline coagulant having a viscosity which can be at any desired value in the range from 200 centipoises to 100,000 centipoises, so that its rate of diffusion into the latex is at a safe level and there is no tendency to form discrete particles of coagulum instead of the desired coherent film or filament. A related object is to provide a method of making coherent films or filaments from latexes, using the improved coagulant.

According to the invention, the foregoing objects are realized by providing a liquid latex capable of forming a coherent filamentary coagulum and a liquid coagulant consisting essentially of a 15 to 40 percent solution by weight of a polyvalent metal salt in water containing from 0.5 to 6 percent by weight of dissolved hydroxyethyl cellulose. A continuous thin supply of one of said liquids is brought into contact with a body of the other said liquid, and the so-formed coherent coagulated strip is withdrawn from the liquid in which it was formed. The resulting product is washed free of coagulant and is dried, with or without prior stretching. In addition to the saline electrolyte and hydroxyethyl cellulose, the coagulant may contain a small amount, usually less than 0.5 percent by weight, of a wetting agent, preferably of the non-ionic type, to lower the interfacial tension between the coagulant solution and the latex.

Numerous conventional thickening agents, each known to be useful in thickening various aqueous media, were found to be ineffective when tried as thickeners for strong solutions of saline electrolytes. Thus agar agar, gum arabic, locust bean gum, gelatin, casein, pectin, zein, corn starch, rice starch, potato starch, "soluble" starch, dextrin, sodium alginate, methyl cellulose, sodium carboxymethyl cellulose, sodium cellulose sulfate, methyl carboxymethyl cellulose, sodium p-styrene sulfonate, polyethylene glycol, Turkey red oil, and several other commercial thickeners of unknown structure were all tried. None of these gave a stable, thickened solution with a calcium chloride content of 20 percent. Gum arabic gave a stable solution, but maximum viscosity was under 100 centipoises. Most of the other agents either gelled or were salted out of solution, and could not be used. In contrast thereto, solutions of hydroxyethyl cellulose and saline electrolytes such as calcium chloride remained stable and showed no undesirable properties. These solutions could be made with viscosities from as low as 200 centipoises to as high as 100,000 centipoises, depending on the amount and type of hydroxyethyl cellulose employed. Hydroxyethyl cellulose is available in several viscosity grades, and these are rated according to the viscosity of their 2 percent solutions in water at 20° C. Thus, it has been found that as little as 0.5 percent of a high viscosity (500 to 600 centipoises in 2 percent solution in water) hydroxyethyl cellulose raises the viscosity of a 20 percent calcium chloride solution to over 200 centipoises, while 6 percent of a low viscosity grade of the same ether (30 to 45 centipoises in standard solution) raises the viscosity of the same concentration of calcium chloride to a value near 800 centipoises. Similarly, 6 percent of the 300 centipoise type of hydroxyethyl cellulose raises the viscosity of a 20 percent calcium chloride solution to over 100,000 centipoises.

The following table illustrates the effect of various concentrations of the 300 centipoise type of hydroxyethyl cellulose on the viscosity of 20 percent solutions of calcium chloride or of aluminum chloride.

| Percent by weight hydroxyethyl cellulose | Viscosity of solution at 22° C., cps. | |
|---|---|---|
| | 20 percent calcium chloride | 20 percent aluminum chloride |
| 0 | 4.75 | 7.25. |
| 0.5 | 19 | 34.5. |
| 1.0 | 70 | 117. |
| 1.5 | 252 | 298. |
| 2.0 | 555 | 598. |
| 3.5 | 7,150 | 6,275. |
| 5.0 | 36,900 | 26,000. |
| 6.0 | Over 100,000 | Over 100,000. |

Similar effects are noted in solutions of manganese chloride, magnesium chloride, aluminum sulfate and ferric alum, all common coagulants.

The new, thickened coagulants are useful with any latex which is capable of forming a coherent coagulum. Examples of such latexes are natural rubber latex, and such synthetic polymer latexes as those of vinylidene chloride-acrylonitrile copolymers, vinyl chloride-vinylidene chloride copolymers, styrene-butadiene copolymers, and acrylonitrile-butadiene copolymers.

In a specific example, a latex of 35 percent solids concentration made by copolymerizing in aqueous emulsion a mixture of 97 percent vinylidene chloride and 3 percent acrylonitrile was spun through a spinneret into a 20 percent solution of calcium chloride. The resulting filamentary coagulum was weak and friable. Similarly, when some of the calcium chloride solution was extruded beneath the surface of some of the same latex, the resulting hollow fiber was weak and friable. When, however, the coagulant was changed to one containing enough hydroxyethyl cellulose to raise its viscosity at least to 200 centipoises, the nature of the coagulum changed to exhibit flexibility and toughness sufficient for easy handling in subsequent fabrication operations, both when the latex was spun into the coagulant and when the coagulant was extruded beneath the surface of the latex.

We claim:

1. The method which comprises providing a liquid latex capable of forming a coherent filamentary coagulum and a liquid coagulant consisting of a solution in water of a polyvalent metal salt capable of coagulating said latex, thickened with enough hydroxyethyl cellulose dissolved in said coagulant to give the coagulant a viscosity of at least 200 centipoises, bringing a continuous thin supply of one of said liquids into contact with a body of the other said liquid, and withdrawing the so-formed coherent coagulated strip from the liquid in which it was formed.

2. The method claimed in claim 1, in which the coagulant is a water solution of from 15 to 40 percent concentration of calcium chloride, thickened with hydroxyethyl cellulose.

3. The method claimed in claim 1, in which the coagulant is a water solution of from 15 to 40 percent concentration of aluminum chloride, thickened with hydroxyethyl cellulose.

4. The method claimed in claim 1, in which a thin body of the latex is brought into contact with the thickened coagulant.

5. The method claimed in claim 1, in which a thin body of the thickened coagulant is brought into contact with the latex.

References Cited in the file of this patent
UNITED STATES PATENTS
1,924,923  Gibbons _____ Aug. 29, 1933